United States Patent [19]

Thomasson

[11] 4,103,161
[45] Jul. 25, 1978

[54] COMPOSITE TRANSDUCER

[75] Inventor: Frederick Young Thomasson, Lynchburg, Va.

[73] Assignee: The Babcock & Wilcox Company, New York, N.Y.

[21] Appl. No.: 705,638

[22] Filed: Jul. 15, 1976

[51] Int. Cl.² .......................... G01T 1/16; G01T 3/00
[52] U.S. Cl. .................................. 250/336; 250/390; 250/392
[58] Field of Search ............... 250/390, 391, 392, 367, 250/336; 73/355 R, 355 EM

[56] References Cited

U.S. PATENT DOCUMENTS

| | | | |
|---|---|---|---|
| 2,910,592 | 10/1959 | Armistead | 250/367 |
| 3,444,373 | 5/1969 | Obrowski | 250/391 |
| 3,524,984 | 8/1970 | Fothergill et al. | 250/336 |
| 3,931,522 | 1/1976 | Rusch | 250/392 X |
| 3,997,789 | 12/1976 | Mathieu | 250/390 |
| 4,002,916 | 1/1977 | Stringer | 250/390 X |
| 4,034,222 | 7/1977 | Azam et al. | 250/336 X |

Primary Examiner—Archie R. Borchelt
Attorney, Agent, or Firm—J. M. Maguire; John F. Luhrs

[57] ABSTRACT

A composite transducer for the measurement of a physical condition such as, but not limited to, temperature, pressure, liquid level, rate of flow, concentration of a constituent gas in a mixture of gases, or neutron flux density; wherein the output signal of a prompt responding but relatively inaccurate sensor is combined with the output signal of a slow responding but relatively accurate sensor to generate a composite transducer output signal having a response time comparable to that of the fast responding sensor and an accuracy equal to that of the slow responding sensor.

8 Claims, 1 Drawing Figure

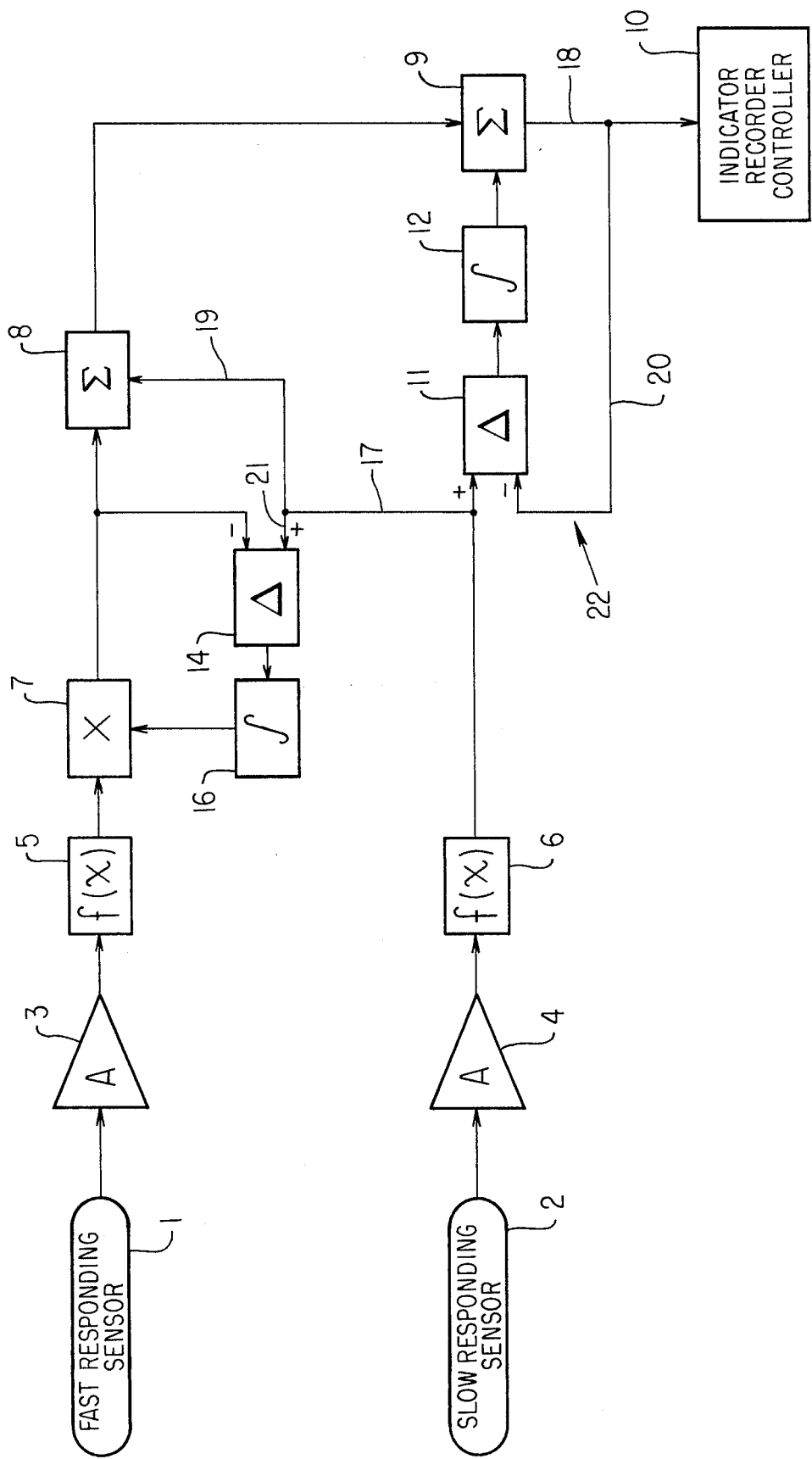

COMPOSITE TRANSDUCER

This invention relates to transducers for the measurement of physical conditions such as, but not limited to, temperature, pressure, liquid level, rate of fluid flow, concentration of a constituent gas in a mixture of gases, or neutron flux density.

Such transducers ordinarily accept the output signal of a sensor, which may be self powered, as the case with a thermocouple, or provided with an external source of power as the case with a resistance thermometer. The output signal of the sensor is then amplified, and if necessary, scaled and linearized, in the transducer to generate a transducer output signal proportional to the output signal of the sensor for indicating, recording and/or control purposes. As well known, such transducers may be provided with circuit components such as filters, shielding and the like whereby the signal to noise ratio is maintained above an acceptable limit.

A universal need in the measurement of such physical conditions is a transducer having a prompt response to changes in the physical condition coupled with a high degree or accuracy. These requirements in many cases are incompatible. Thus, a bare thermocouple will respond rapidly to changes in temperature. Such a thermocouple is, however, subject to contamination from ambient conditions causing a decrease in accuracy. On the other hand, either a thermocouple or a resistance thermometer properly protected from deleterious ambient conditions, while maintaining a high degree of accuracy, will be found to be so slow responding to changes in temperature as to render it unacceptable for many applications. This is but one specific example of the general difficulty experienced in the measurement of physical conditions requiring prompt response to changes in the condition coupled with the requirement for high accuracy. It is to the solution of this problem that the present invention is addressed.

In accordance with the invention a transducer generates an output signal which is the composite of input signals from a first prompt responding sensor of more or less accuracy and that derived from a second relatively slow responding sensor having a high degree of accuracy.

Further in accordance with the invention the output signal of the transducer responds immediately to changes in the output signal of the first sensor thereby immediately exhibiting changes in the physical condition and to the time integral of the departure of the output signal of the first sensor from the output signal of the second sensor to thereby generate a transducer output signal proportional to that of the second sensor and hence exhibiting the value of the physical condition to a high degree of accuracy.

Further, in accordance with the invention, the output signal of the second sensor may be utilized to continuously calibrate the output signal of the first sensor under steady state conditions to thereby minimize the correction of the transducer output signal required to maintain it proportional to the output signal of the second sensor.

These and other objectives of the invention will be apparent as the description proceeds in connection with the drawing.

IN THE DRAWING

The drawing is a logic diagram of a transducer embodying the principles of the invention as applied to the measurement of neutron flux density in a nuclear reactor by means of self powered, in-core neutron flux sensors.

DETAILED DESCRIPTION

A critical meansurement in the operation of nuclear reactors is that of in-core neutron flux density. Heretofore such measurements in selected core locations have been made by self powered rhodium sensors. Such sensors have an acceptable degree of accuracy but are slow responding to changes in flux density, having a time constant, i.e. the time required to decay or rise to sixty three percent of a step change in flux density, in the order of one or more minutes, thus prohibiting their use in a reactor control or safety channel, and limiting their use to providing a history of power distributions and variations during power operating modes. Such a sensor is diagrammatically illustrated in the drawing at 2.

Also available for in-core neutron flux density measurement are prompt responding sensors having a time constant in the order of one to twenty milliseconds, thus having the necessary speed of response for use in a reactor control or safety channel. However, such fast responding sensors may not have an acceptable degree of initial accuracy, and may not possess a predetermined functional relationship between neutron flux density and signal output. Thus, at present, their usefulness in monitoring reactor operation is limited. Typical of such prompt responding sensors is the ytterbium sensor diagrammatically illustrated in the drawing at 1. Pairs of sensors such as shown at 1 and 2 may be located at selected critical points throughout the reactor core.

In the composite transducer now to be described the signal outputs of the sensors 1 and 2 are amplified as required in amplifiers 3 and 4 respectively. The output signals from the amplifiers may, if desired or necessary, be linearized and scaled in function generators 5 and 6. The output signal from function generator 5, that is the signal proportional to the output signal of sensor 1, is transmitted as a feedforward signal through circuit components 7, 8, and 9, later to be described, to an appropriate indicating, recording and/or controlling device such as shown at 10. Thus the transducer provides an output signal responding immediately to changes in flux density.

The output signal from function generator 6, that is the signal proportional to the output signal of sensor 2, serves to modify, by means of a closed feedback loop, the output signal from function generator 5, that is the signal proportional to the output signal of sensor 1, at a relatively slow continuing rate until, under steady state conditions, the transducer output signal inputing to the device 10 through line 18 is equal to the output signal from function generator 6. This is accomplished by means of the feedback loop, generally indicated at 22, wherein the transducer output signal is fed back through line 20 to a difference unit 11, generating an output signal proportional to the departure of the transducer output signal from the output signal of function generator 6. A time integral unit 12 receiving this signal generates an output signal which serves, through summing unit 9, to adjust the transducer output signal at a controlled rate until equal to the output signal of function generator 6. Thus the transducer output signal, while responding promptly to changes in flux density, also exhibits the level of flux density to the degree of accuracy of the slow responding high accuracy sensor 2.

To reduce the correction required to the transducer output signal through the feedback loop 22, the invention comprehends modifying this signal immediately and in proportion to changes in the signal generated from the sensor 2 by transmitting this last named signal through a line 17 and branch line 19 to the summing unit 8. The output signal from this unit, transmitted to summing unit 9, acts to change the output signal of function generator 5 immediately and in proportion to changes in the output signal from function generator 6.

In those instances where the accuracy of the fast responding sensor 1 varies extensively and more or less at random, the invention further comprehends calibrating this signal, under prolonged steady state conditions, using the signal generated from the slow responding sensor 2 as a standard. As shown, the output signal from function generator 6 through line 17 and a branch line 21 inputs to a difference unit 14 into which is fed back the output signal from multiplying unit 7. An integrating unit 16, receiving the output signal from difference unit 14 generates an output signal which inputs to the multiplying unit 7 and serves to apply a calibration correction to the signal generated in function generator 5 under steady state conditions.

In the drawing and the description conventional logic symbols have been used. It should be recognized that the control components, or hardware, as it is sometimes called, which such symbols represent, are commercially available and their operation well understood by those familiar with the art. Further conventional logic symbols have been used to avoid specific identification with any particular type of components such as pneumatic, hydraulic, or electronic, as the invention comprehends utilizing any one or a combination of such types.

It is apparent that the composite transducer has been illustrated and described by way of example only and that various modifications can be made within the scope of the invention as defined in the appended claims.

I claim:

1. A transducer generating an output signal proportional to the magnitude of a physical condition, comprising, a first prompt responding sensor generating a signal corresponding to the magnitude of the physical condition, a second slow responding sensor generating a signal corresponding to the magnitude of the physical condition of high accuracy relative to the accuracy of the first sensor but having a long time constant relative to the time constant of the first sensor, a circuit responsive to the signals generated by the first and second sensors generating an output signal varying in accordance with changes in the signal generated by the first sensor and including means adjusting the circuit output signal to correspond to the signal generated by the second sensor at a controlled rate.

2. In a transducer as set forth in claim 1 wherein said last named means modifies the circuit output signal at a rate proportional to the time integral of the deviation in the signal generated by the first sensor from the signal generated by the second sensor.

3. In a transducer as set forth in claim 1 further including means modifying the signal generated by the first sensor proportional to changes in the signal generated by the second sensor.

4. In a transducer as set forth in claim 1 further including means modifying the signal generated by the first sensor at a rate proportional to the time integral of the deviation in the signal generated by the first sensor from the signal generated by the second sensor.

5. In a transducer as set forth in claim 4 wherein said modifying means includes a difference unit generating an output signal proportional to the difference between the signals generated by the first and second sensors, an integrating unit responsive to the output signal of the difference unit generating an output signal proportional to the time integral of the difference unit output signal and a multiplying unit multiplying the signal generated by the first sensor by the signal output of the integrating unit to generate a modified signal from said first sensor equal to the signal generated by the second sensor.

6. A transducer as set forth in claim 3 wherein said modifying means includes a summing unit generating an output signal proportional to the sum of the signals generated by the first and second sensors.

7. In a transducer as set forth in claim 1 wherein said circuit includes function generators responsive, respectively, to the signals generated by the first and second sensors and generating output signals varying in predetermined functional relationship to the signals generated by the first and second sensors.

8. A transducer as set forth in claim 1 wherein said first prompt responding sensor is a self powered ytterbium sensor responsive to neutron flux density and said second slow responsive sensor is a self powered rhodium sensor responsive to neutron flux density.

* * * * *